United States Patent
Zakula, Sr. et al.

[11] Patent Number: 6,123,518
[45] Date of Patent: Sep. 26, 2000

[54] INTEGRAL SHAFT COUPLING FOR A FLEXIBLE DRIVEPLATE IN A PUMP DRIVETRAIN

[75] Inventors: Daniel Brian Zakula, Sr., Mokena; Robert W. Earley, Minooka, both of Ill.

[73] Assignee: Mi-Jack Products, Inc., Hazel Crest, Ill.

[21] Appl. No.: 09/041,710

[22] Filed: Mar. 13, 1998

[51] Int. Cl.[7] .............................. F09B 17/00; F16H 3/08
[52] U.S. Cl. .............................................. 417/364; 74/325
[58] Field of Search ................................... 417/364, 303; 464/182, 89, 53, 189, 98, 104; 192/3.51; 212/170, 174; 64/27; 51/376

[56] References Cited

U.S. PATENT DOCUMENTS

| | | | |
|---|---|---|---|
| 2,080,455 | 5/1937 | Bechtel | 29/159 |
| 3,645,406 | 2/1972 | Brazell | 212/14 |
| 3,788,099 | 1/1974 | Miller | 64/12 |
| 3,792,779 | 2/1974 | Brazell | 212/2 |
| 4,254,912 | 3/1981 | Lebrun et al. | 239/183 |
| 5,221,232 | 6/1993 | Nameny | 464/98 |
| 5,586,938 | 12/1996 | Schurhorster | 464/92 |
| 5,697,848 | 12/1997 | Bosley | 464/98 |
| 5,810,183 | 9/1998 | Feider et al. | 212/291 |
| 5,893,471 | 4/1999 | Zakula | 212/345 |
| 5,908,284 | 6/1999 | Lin | 416/134 R |
| 5,987,287 | 11/1999 | Huang | 399/265 |

Primary Examiner—Teresa Walberg
Assistant Examiner—Daniel Robinson
Attorney, Agent, or Firm—Leydig, Voit & Mayer, Ltd.

[57] ABSTRACT

An integral coupling is provided for transmitting torque from a flexible driveplate mounted to an engine flywheel. The coupling has a base portion which is fixed to the flexible driveplate and a shaft portion which extends axially away from the base portion. The shaft portion has male splines which are shaped to be matably received in a female splined connector of a rotatable member. In particular, the female splined connector is formed in the hub of a gearbox input pinion driving a gearbox which, in turn, drives a hydraulic pump supplying hydraulic pressure to systems of a gantry crane. The integral coupling permits axial movement at the male splined end which is distally located relative to the flexible driveplate. The integral coupling provides improved performance over a conventional two-piece coupling having a male—male splined shaft which matably fit the base portion mounted to the flexible driveplate.

12 Claims, 5 Drawing Sheets

INTEGRAL SHAFT COUPLING FOR A FLEXIBLE DRIVEPLATE IN A PUMP DRIVETRAIN

BACKGROUND OF THE INVENTION

The present invention generally relates to a shaft coupling and more particularly relates to a coupling for transmitting torque from a flexible driveplate of an engine to a shaft driving a gearbox.

Mobile gantry cranes are generally known for lifting, loading, and moving heavy loads and containers. Such cranes are commonly used at shipping yards, railyards, construction sites, etc. A gantry crane typically has a frame which supports a hoisting device in an elevated manner. Particularly, the frame may include a movable trolley assembly from which wire ropes are movably suspended for lifting and lowering loads. A rotatable hoisting drum is mounted to the trolley assembly to pay out and retract the wire ropes. Also, gantry cranes are typically provided with drivable and steerable wheels so that the cranes can be driven around a site for loading.

Hydraulic power is conventionally used for operating some or all of the functions on a gantry crane. For example, hydraulic actuators, such as hydraulic motors or hydraulic cylinders are conventionally provided to drive and steer the wheels, move the trolley on the frame, and/or rotatably drive the hoisting drum. Such hydraulic motors and actuators are supplied with pressurized hydraulic fluid from a hydraulic pump.

An internal combustion engine drives the hydraulic pump via a transmission gearbox. A conventional engine has a rotating flywheel driven by the crankshaft. Various coupling assemblies are known for torsionally connecting the engine flywheel to an input of gearbox. In order to compensate for axial misalignment between the flywheel and the gearbox input pinion, it is known to secure a flexible plate to the flywheel and to mount the coupling centrally to the flexible driveplate. The flexible plate has a circular body which is circumferentially secured to the flywheel, and the body has an inner portion that is spaced from the flywheel. A coupling according to the invention is mounted to a center of the flexible driveplate to transfer torque to the gearbox input pinion. If the gearbox input pinion is axially misaligned relative to the engine flywheel, the flexible plate resiliently deforms accordingly, while still transmitting torque from the flywheel to the coupling member to drive the gearbox.

The conventional coupling includes two pieces: (a) a female spline coupling member mounted to the flexible plate, and (b) a male—male splined shaft member. One end of the conventional male—male splined shaft member is matably received in the female spline coupling member, and an opposite end of the male—male splined shaft member is matably received in the female splined hub of the gearbox input pinion. More specifically, the shaft member has oppositely-directed male splined ends which are received in respective female splined openings formed in the female coupling member and the gearbox pinion. Together, the splined connections facilitate torque transmission from the flexible driveplate to the gearbox input shaft. Additionally, both of the splined connections accommodate axial vibration or movement which may occur between the flexible plate and gearbox input pinion.

The conventional coupling with the male—male splined shaft has tended to excessively wear against the female coupling member, ultimately causing failure of the coupling. This necessitates maintenance to replace the coupling and results in undesirable down time of the crane, reducing productivity of the crane and the loading facility. On a conventional coupling assembly, the splines of the female coupling are positioned closely to the flexible drive plate. This close axial proximity subjects the female coupling member to high wear forces during deformation of the flexible driveplate. The spline coupling at the pinion, however, is positioned farther away from the driveplate in an axial direction, creating a leverage or mechanical advantage which lessens the lateral wear forces on the splines. Therefore, the spline coupling at the input pinion is subjected to a lower wear rate than the female coupling on the conventional driveplate.

It is desirable to provide an improved coupling which transmits torque from a flexible driveplate to a gearbox which has reduced wear.

SUMMARY OF THE INVENTION

The present invention provides an improved coupling which is mountable to a flexible driveplate and includes an integral base portion and a shaft portion. More specifically, the base portion is mounted to a flexible driveplate of an engine. The shaft portion is integrally connected to, and extends from, the base portion in an axial direction. An end of the shaft portion opposite the base is formed with male splines. The coupling also includes a second coupling member which is mounted to the gearbox input shaft and has an opening formed with female splines to receive the male-splined end of the first coupling member. The single splined connection between the first and second coupling members transmits torque while suitably accommodating axial movement of the flexible plate relative to the gearbox input shaft.

Because the first coupling member has an integral base portion and shaft portion, the coupling according to the invention advantageously eliminates a need for a splined connection of the shaft to the base portion. Accordingly, there is no movement or wear between the shaft portion and the first connector portion.

An advantage of the present invention is that it provides a coupling which is subjected to minimal wear.

Another advantage of the present invention is that it provides a coupling having an extended service life.

A further advantage of the present invention is that it provides a coupling system having fewer parts.

Additional features and advantages of the present invention are described in, and will be apparent from, the description of the invention herein, the claims, and from the drawings.

DETAILED DESCRIPTION OF THE DRAWINGS

Figure 1:
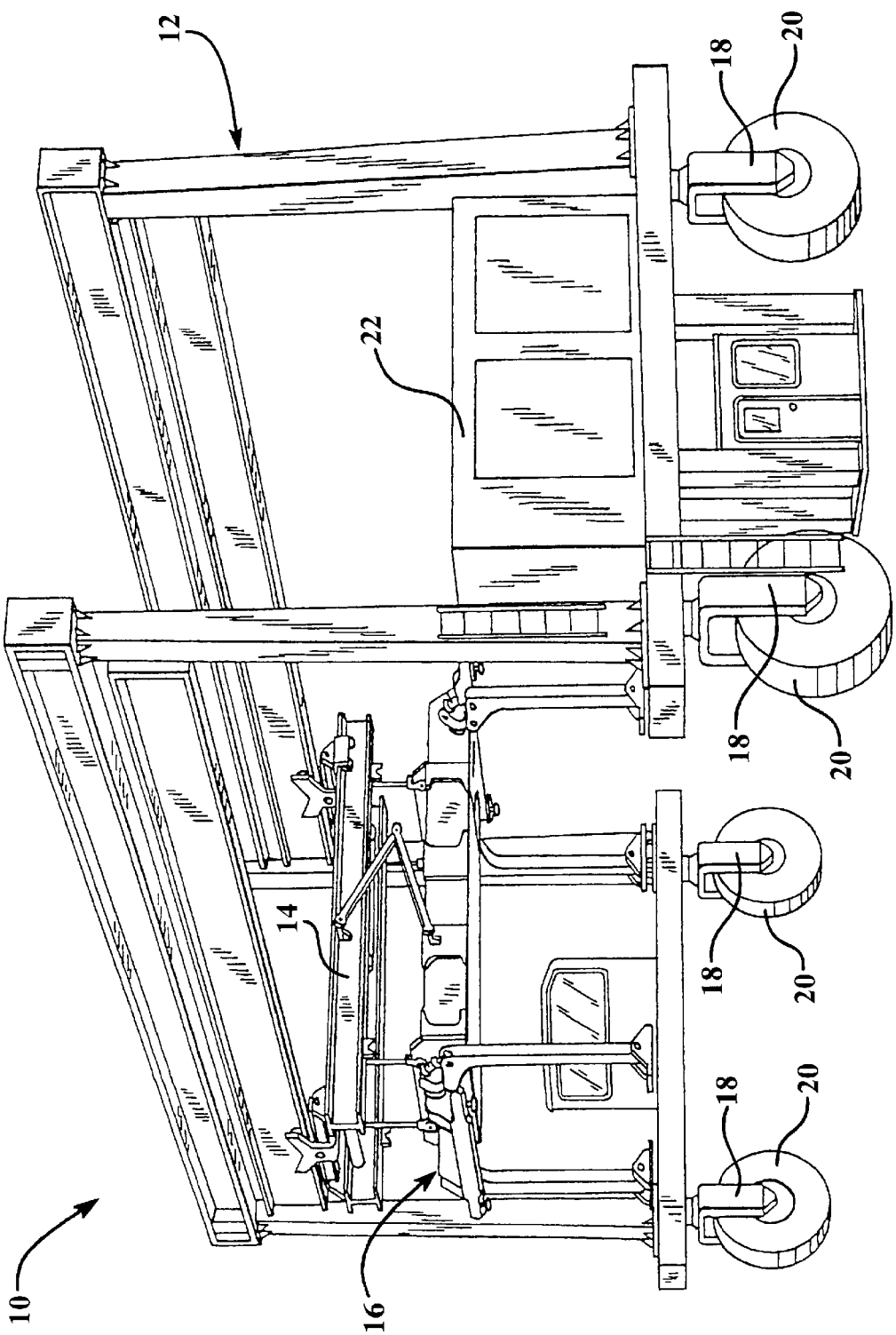
FIG. 1 is a perspective view of a mobile gantry crane.

Now turning to the Figures, wherein like numerals designate like components, FIG. 1 illustrates a mobile gantry crane 10 for moving containers or other loads. Generally, the gantry crane 10 includes a frame 12, a trolley 14 mounted to an upper portion of the frame 12, and a grappler 16 movably suspended from the trolley 14. The illustrated grappler 16 is adapted to engage a standard shipping container, although other types of grapplers are known for lifting various items. The gantry crane 10 further includes a plurality of yokes 18 within which respective wheels 20 are rotatably mounted. So that the crane 10 can be maneuvered around a shipping yard on the wheels 20, at least two of the yokes 18 are steerable, and at least two of the wheels 20 are rotatably driveable. The crane 10 utilizes appropriate hydraulic actuators (not shown), such as hydraulic motors and/or hydraulic cylinders, for operating some or all of its functions—steering the wheels 18, driving the wheels 18, moving the trolley 14, lifting and lowering the grappler 16, etc. In order to drive such actuators, the crane 10 includes a power unit 22 supplying fluid pressure through an appropriate hydraulic system.

Figure 2:
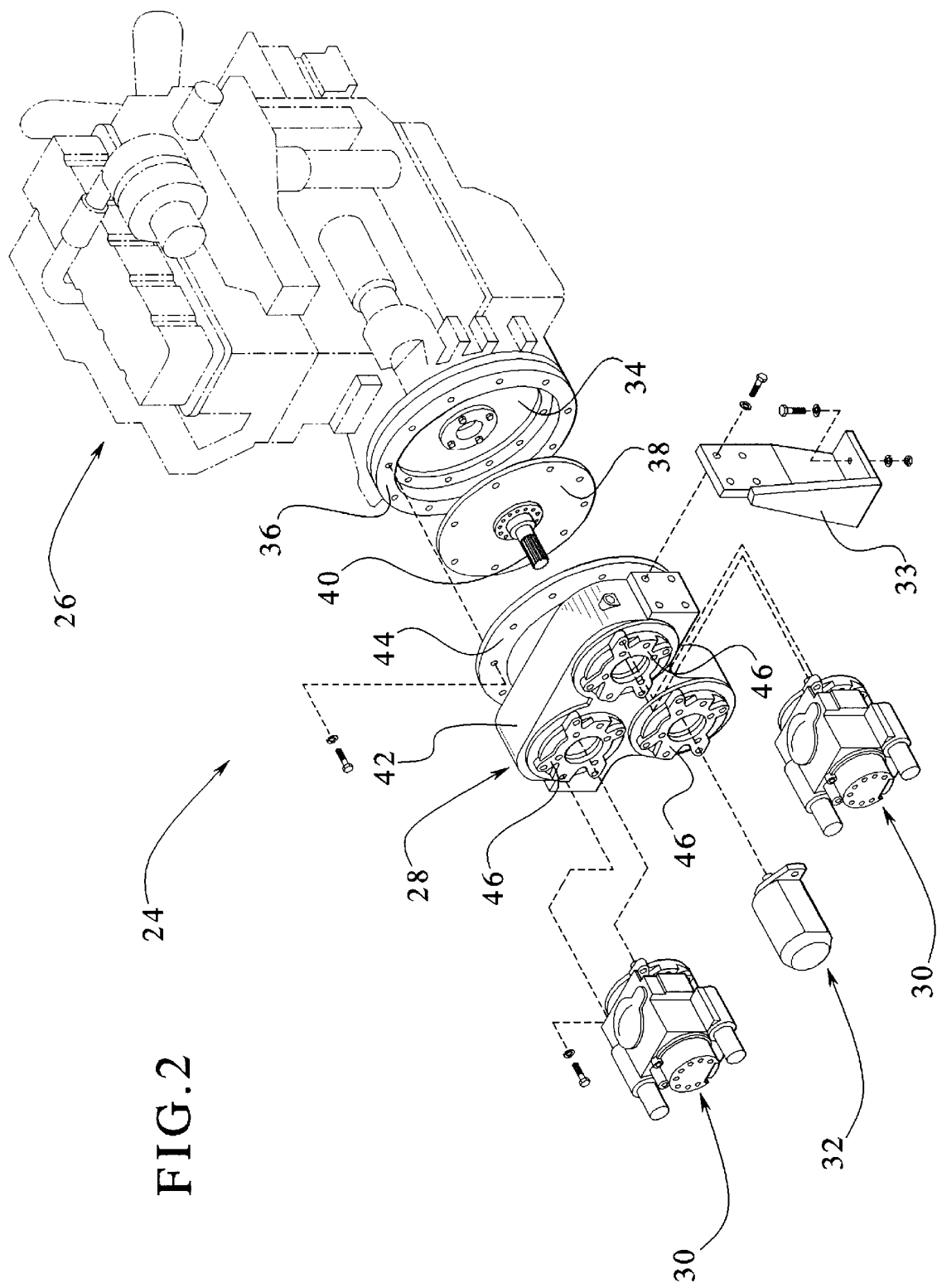
FIG. 2 is an exploded perspective view of pump drivetrain components in a power unit of a crane.

Contained within the power unit 22, turning to FIG. 2, is a pump drivetrain 24 including an engine 26, a gearbox 28, and a plurality of pumps 30, 32. In general, the engine 26, which may be a diesel engine or alternatively a gasoline engine, is operably connected to drive the pumps 30, 32 via the gearbox 28. The pumps 30, 32 provide hydraulic pressure to operate the actuators. For example, in an embodiment, the two pumps 30 provide hydraulic pressure to drive the wheels 20, move the trolley 14, and raise and lower the grappler 16, while the pump 32 provides hydraulic pressure to selectively steer the yokes 18. To secure the drivetrain 24 relative to the frame 22 (FIG. 1), the gearbox 28 is bolted to a pair of engine support brackets 33.

Figure 3:
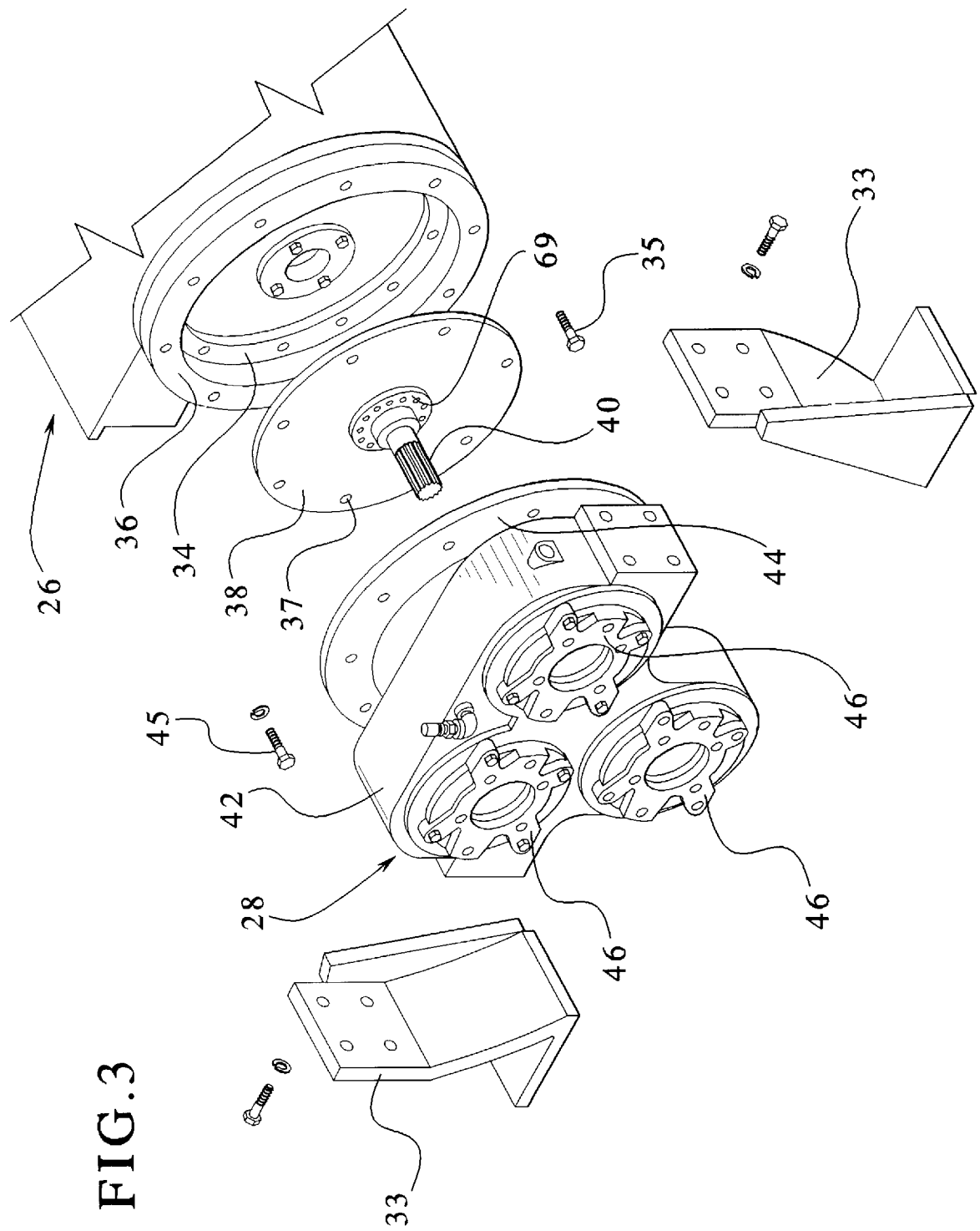
FIG. 3 is a fragmentary exploded perspective view of drivetrain components of the power unit of FIG. 2, including a flexible drive plate having a coupling according to the invention.

In order to operate the pumps 30, 32, rotational power must be transmitted from the engine 26 to the gearbox 28. Referring to FIGS. 2 and 3, the engine 26 includes a conventional flywheel 34 that is rotatably driven about a central axis within a protective bell housing 36 of the engine 26. A flexible driveplate 38 is fixedly mounted to the flywheel 34 with bolts 35 extending through boltholes 37 disposed around a circumferential region of the driveplate 38 so that the driveplate 38 rotates with the flywheel 34. An integral coupling 40 according to the invention is centrally fixed to the flexible driveplate 38 to transfer torque from the driveplate 38 to the gearbox 28.

Figure 4:
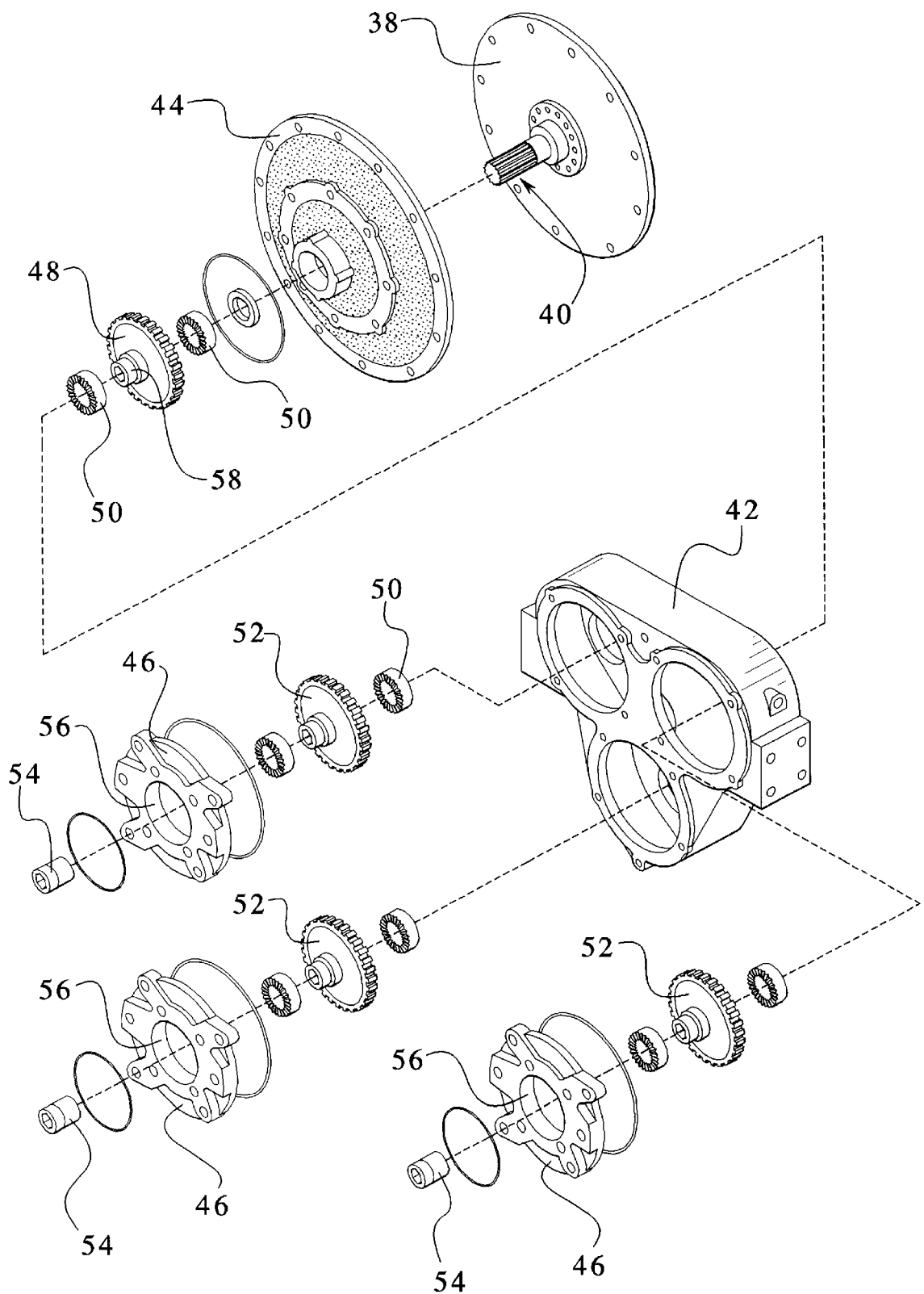
FIG. 4 is an exploded perspective view of a gearbox and the flexible driveplate assembly which has a coupling according to the invention.

As illustrated in FIG. 4, the gearbox 28 includes housing 42. For mounting the gearbox 28 to the engine 26, an engine adapter plate 44 is fitted to a front side of the gearbox 28. The engine adapter plate 44 is shaped to fit against the bell housing 36 of the particular engine 26 (FIG. 1) and secure thereto with a plurality of bolts 45, holding the gearbox 28 securely relative to the engine 26. Additionally, at a rear side the gearbox 28, one or more pump adapter plates 46 are secured to the housing to accommodate the mounting of the respective pumps 30, 32.

Still referring to FIG. 4, for receiving rotational input, the gearbox 28 has a rotatable member such as an input pinion 48 which is mounted rotatably on bearings 50 within the housing 42 to drivably engage a plurality of drive pinions 52. So that the pumps 30, 32 are driven by the respective drive pinions 52, each of the drive pinions 52 is rotatably mounted within the housing 42 generally forwardly of the respective pump adapter plates 46. In order to operably drive the pumps 30, 32 from the drive pinions 52, adapter sleeves 54 are provided, each of the sleeves 54 engaging a center of the respective drive pinion and extending through an opening 56 in the respective pump adapter plate 46.

For driving the gearbox 28, the integral coupling 40 is engagable with the input pinion 48 for torque transmission. Accordingly, the input pinion 48 includes a hub formed as a female spline connector 58. More specifically, a center of the input pinion 48 has a cavity with axial splines. The female spline connector 58 is shaped to receive the coupling in a mated engagement for rotatable movement therewith, as described in greater detail below. Torque is transferred from the engine flywheel 34, through the flexible driveplate 38 and integral coupling 40 fixed thereto, to the input pinion 48 of the gearbox 28. The driveplate 38 is flexible in order to permit axial misalignment of coupling 40 and input pinion 48 relative to the driveplate 38 during rotation. However, lateral forces act against the integral coupling 40 as a result of such a resilient deformation of the rotating flexible plate during such an alignment correction.

Figure 5:
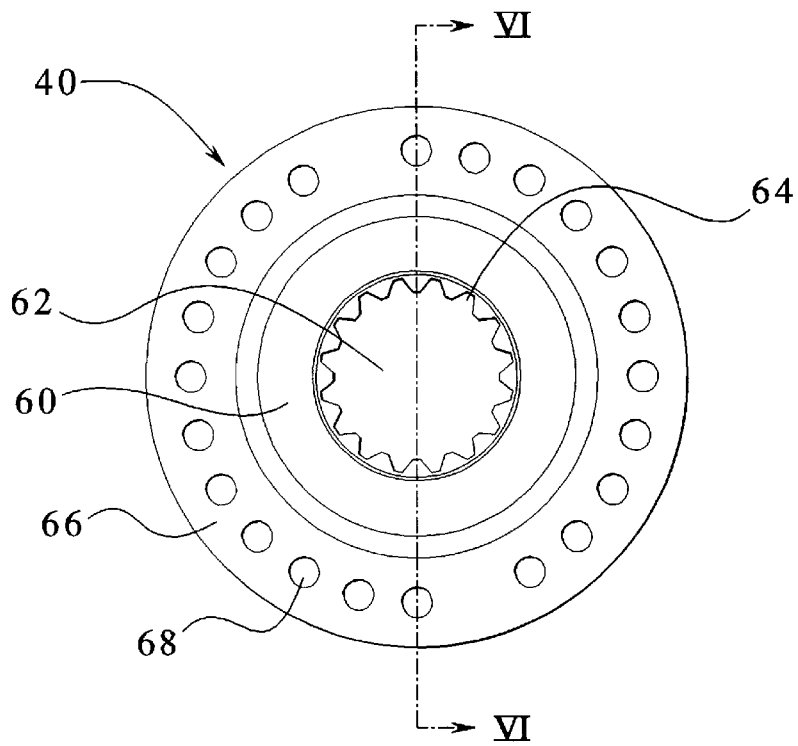
FIG. 5 is an elevational end view of the coupling according to the invention.
Figure 6:
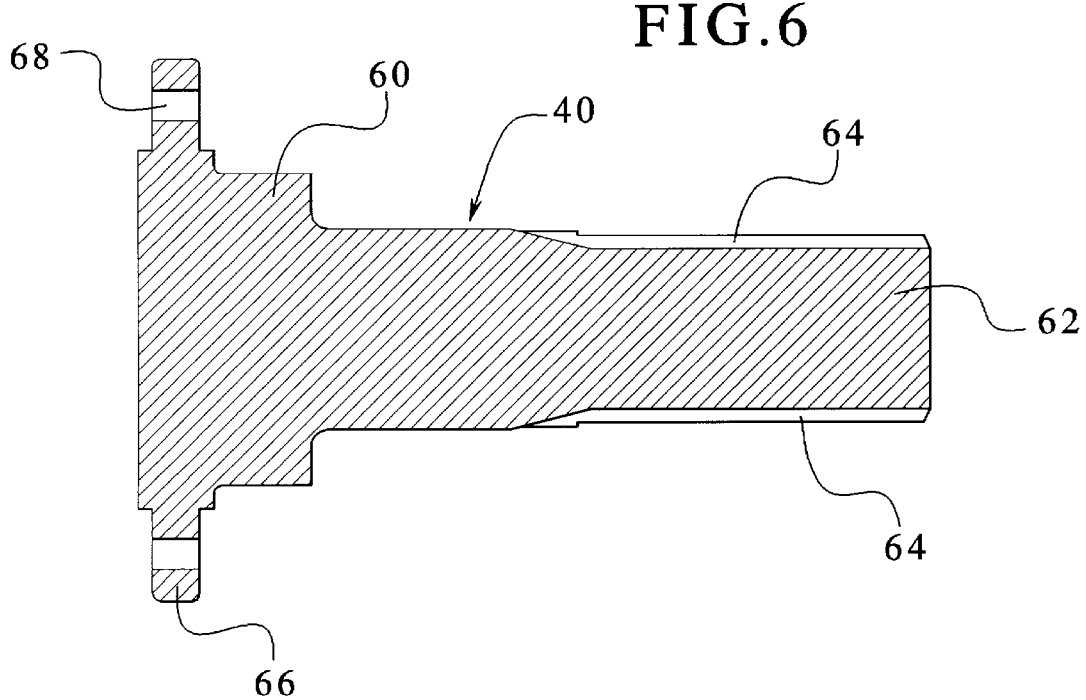
FIG. 6 is a side sectional view of the coupling according to the invention taken generally along line VI—VI of FIG. 5.

Turning to FIGS. 5 and 6, the coupling 40 is illustrated in greater detail. The coupling 40 includes a base portion 60 which is adapted to be mounted to the flexible driveplate 38. According to the invention, the coupling 40 includes a male shaft portion 62 which is integrally formed with or connected to the base portion 60. The male shaft portion 62 projects axially from the base portion 60 in a cantilevered manner. The coupling 40 is preferably a unitary component made of steel.

So that the integral coupling 40 can cooperatively engage the input pinion 48 for torque transmission, the shaft portion 62 of the coupling 40 has male splines 64 extending in an axial direction, the splines 64 being shaped to matably engage within the female spline connector 58 of the gearbox input pinion 48. The splines 64 of coupling 60 interlock relative to the input pinion 48 in a rotational direction, while permitting axial movement.

Because the coupling 40 has an integral base portion 60 and shaft portion 62, the coupling 40 advantageously eliminates a conventional splined connection at the flexible plate 38. Because there is no relative movement between the integral shaft portion 62 and the base portion 60, these components do not wear against each other. Axial movement between the input pinion and the flexible plate is compensated by the coupling 40, however, by the splined connection of the male shaft member 62 at the female spline connector 58 of the input pinion 48. Advantageously, this relative movement of the coupling 40 against the input pinion occurs at a distance relative to the flexible driveplate 38. By eliminating the additional splined connection of a conventional two-piece coupling where the base portion receives an end of the male—male shaft proximal to the flexible plate, the coupling of the invention is subjected to less wear than a conventional coupling.

As illustrated in FIGS. 5 and 6, the base 60 is generally cylindrical. Furthermore, the base 60 has a circular flange 66 which extends radially outwardly. The flange 66 has a plurality of fastener openings 68 disposed therein to facilitate mounting of the coupling 40 to the flexible driveplate 38 with fasteners 69 (FIG. 3) such as bolts or rivets. These fasteners respectively extend through the fastener openings 68 in the flange 66 and are fixed to the flexible driveplate 38 in an appropriate manner. The shaft portion 62 preferably has a diameter smaller than the base portion 60.

Although the invention is described herein in connection with certain preferred embodiments, it is recognized that various changes and modifications to the invention will be apparent to those skilled in the art. Such changes and modifications may be made without departing from the spirit and scope of the invention. Accordingly, the appended claims are intended to cover all such changes and modifications.

What is claimed is:

1. An integral coupling for transmitting torque in a pump drivetrain, the coupling having opposite proximal and distal ends, the coupling comprising: a proximal base portion adapted for mounting to a flexible driveplate; and a shaft portion integrally connected to and extending distally from the base portion in an axial direction, a distal region of the shaft portion having male splines shaped to be matably received by female splines of a rotatable member.

2. A coupling according to claim 1, wherein said base portion is generally cylindrical, including a radially-extending circular flange having a plurality of fastener openings disposed therein.

3. A coupling according to claim 1, wherein said rotatable member is an input pinion of a gearbox driving at least one hydraulic pump.

4. A gantry crane for handling loads, the crane comprising:

a frame;

a hydraulic system including at least one hydraulic pump;

a gearbox operably connected to drive the pump, the gearbox including a rotatable input pinion having a central female spline connector;

an engine with a rotatable flywheel;

a flexible driveplate having an outer circumferential region secured to said flywheel; and an integral coupling member mounted to said flexible driveplate to transmit torque from the flexible driveplate to the input pinion, the coupling including a base portion mountable to a flexible driveplate, and a shaft portion integrally connected to and projecting from the base portion in an axial direction, the shaft portion having axially-directed male splines adapted to engage the female spline coupling of the input pinion.

5. A gantry crane according to claim 4, wherein said integral coupling engages with said input pinion for fixed movement therewith in a rotational direction and while being relatively movable in the axial direction.

6. A gantry crane according to claim 4, wherein said base portion includes circular flange having a plurality of fastener openings disposed therein, the flange being securable against said flexible driveplate with fasteners extending through the fastener openings.

7. A gantry crane according to claim 6, wherein said base portion of said first coupling member is mounted to the flexible driveplate with a plurality of fasteners respectively extending through said fastener openings.

8. A gantry crane according to claim 7, wherein said fasteners are bolts.

9. A gantry crane according to claim 7, wherein said fasteners are rivets.

10. A pump drivetrain for a gantry crane comprising:

a flexible driveplate having a circumferential region adapted for mounting to an engine flywheel;

an integral coupling having a proximal base portion mounted to said flexible driveplate and a shaft portion integrally connected to and extending distally from the base portion in an axial direction, a distal region of the shaft portion having axially-aligned male splines.

11. A pump drivetrain according to claim 10, further comprising a gearbox including a gearbox input pinion having a central female splined connector shaped to matably receive said male splines of said shaft portion in a drivable engagement while permitting relative axial movement.

12. A pump drivetrain according to claim 10, wherein said base portion is generally cylindrical and includes a radially-extending circular flange having a plurality of fastener openings disposed therein, the flange being securable against said flexible driveplate with fasteners extending through the fastener openings.

* * * * *